United States Patent [19]

Lawson

[11] Patent Number: 4,883,293
[45] Date of Patent: Nov. 28, 1989

[54] CLAMP CONNECTOR
[75] Inventor: John E. Lawson, Woking, England
[73] Assignee: Cameron Iron Works USA, Inc., Houston, Tex.
[21] Appl. No.: 249,730
[22] Filed: Sep. 27, 1988
[51] Int. Cl.⁴ .............................................. F16L 21/06
[52] U.S. Cl. .................................... 285/364; 285/406; 285/920
[58] Field of Search ............... 285/364, 406, 367, 373, 285/419, 920

[56] References Cited

U.S. PATENT DOCUMENTS

| | | | |
|---|---|---|---|
| 2,333,243 | 11/1943 | Glab | 285/406 |
| 2,752,173 | 6/1956 | Krooss | 285/367 |
| 2,862,729 | 12/1958 | Bredtschneider | 285/364 |
| 2,956,818 | 10/1960 | Dickerson et al. | 285/18 |
| 3,220,245 | 11/1965 | Van Winkle | 285/364 |
| 3,231,297 | 1/1966 | Watts et al. | 285/24 |
| 4,579,372 | 4/1986 | Morrill | 285/920 |
| 4,725,080 | 2/1988 | Josefiak et al. | 285/920 |

FOREIGN PATENT DOCUMENTS

| | | | |
|---|---|---|---|
| 541381 | 8/1959 | Belgium | 285/367 |
| 538523 | 1/1957 | Italy | 285/920 |

Primary Examiner—Randolph A. Reese
Assistant Examiner—Anthony Knight

[57] ABSTRACT

An improved clamp connector for securing ends of tubular members together in tight sealed relationship and including a pair of semicircular segments having lips to engage the opposite sides of abutting projections on the tubular members, a pressure responsive actuator to preload the segments on the projections, connecting studs between the segments which are loaded by the actuator and blocks of a preselected size to be positioned in supporting relationship to the actuator in its preload position to maintain such preload on the segments and studs after the fluid pressure on the actuator is released. A pressure responsive portion of the blocks allows their quick and positive release when desired.

1 Claim, 3 Drawing Sheets

CLAMP CONNECTOR

BACKGROUND

The present invention relates to an improved clamp connector for connecting adjacent flanges providing a pressure responsive actuator for setting a preload on the studs joining the two clamping half rings and suitable pressure responsive blocks which are inserted to maintain the preload on the studs after the pressure has been released.

Connector clamps are known in the prior art and have suggested the use of clamping segments to engage abutting flanges to cause them to be drawn together and held in such position. One example of this type of clamp is shown in U.S. Pat. No. 3,231,297 to J. D. Watts et al which includes three segments pivotally connected with a threaded member connecting the ends of the segments after the assembly has been installed on abutting portions of tubular members which are to be connected. The threaded member places the segments in tension around the ends of the tubular members and maintains the gripping engagement of the segments with the tubular members.

Another patent of the prior art includes U.S. Pat. No. 2,956,818 to J. D. Dickerson et al which discloses the use of semicircular segments which engage flanges of abutting tubular members and are tightened in their clamping engagement by threaded members which are to maintain the tubular members in tight sealing engagement with each other.

SUMMARY

The present invention provides an improved clamping connector for tubular members which are to be held in tight sealing engagement with each other. The improved clamping connector includes a pair of semicircular segments having lips to engage the opposite sides of abutting projections or flanges on the tubular members, a pressure responsive actuator to preload the segments on the flanges to bring them into tight sealing engagement, connecting studs between the segments under the preselected preload and block members of a preselected size to be positioned in supporting relationship to the actuator in its preload position to maintain such preload after the fluid pressure on the actuator is released. The block members are provided with a pressure responsive actuator so that they may be easily and quickly removed when the clamping segments are to be released from engagement with the tubular member flanges.

An object of the present invention is to provide an improved clamping connector for securing abutting ends of tubular members together which maintains them under a preselected load which once established by fluid pressure is thereafter independent of such fluid pressure.

Another object is to provide an improved clamping connector for securing abutting ends of tubular members together in tight sealing engagement with each other which can be operated quickly and simply.

A further object is to provide an improved clamping connector for securing abutting ends of tubular members together in tight sealing engagement under a preselected preload which can be quickly and easily disconnected.

BRIEF DESCRIPTION OF THE DRAWINGS

These and other objects and advantages are hereinafter set forth and explained with reference to the drawings wherein.

DESCRIPTION OF THE PREFERRED EMBODIMENT

Figure 1:
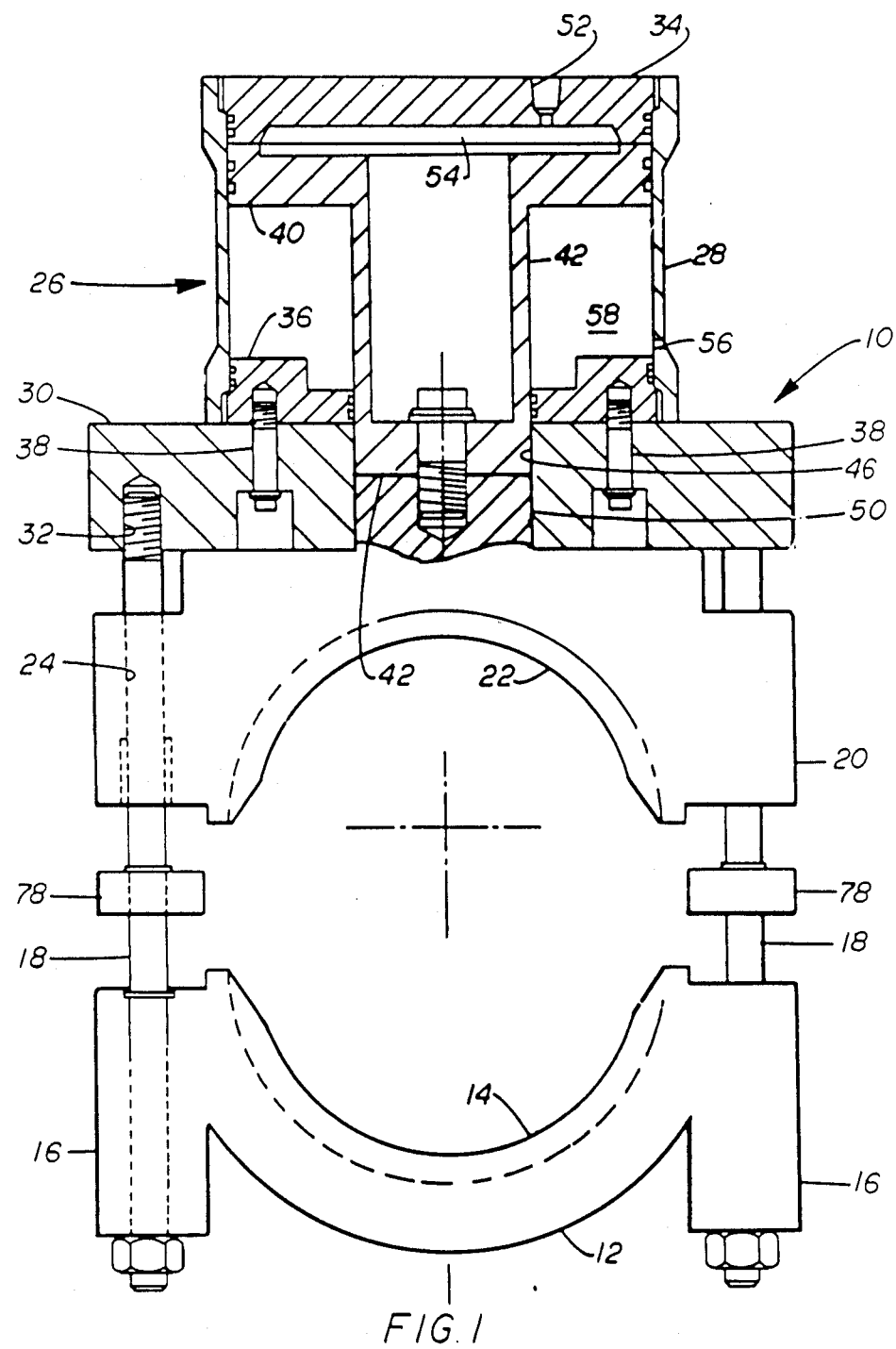
FIG. 1 is an elevation view of the improved connector clamp of the present invention in open position with the clamp in open position and with the actuator shown in section.

Improved clamp 10 of the present invention includes first arcuate segment 12 having lips 14 extending radially inward and outer projections 16 through which tension members or studs 18 extend as hereinafter explained, a second arcuate segment or body 20 having lips 22 extending radially inward and side openings 24 through which tension members or studs 18 extend and actuator 26. Actuator 26 includes tubular body 28 secured to plate 30 which has threaded openings 32 for receiving the threaded ends of tension members or studs 18, end closure 34 secured and sealed within the outer end of tubular body 28, flange 36 which is secured to plate 30 by cap screws 38 and piston 40 which has its outer diameter positioned within tubular body 28 and a projection 42 extending within opening 44 through flange 36 and opening 46 in plate 30. Suitable sealing means is provided in the interior of flange 36 for sealing against the interior of tubular body 28 and against the exterior of projection 42. Screw 48 secures the end of piston projection 42 to projection 50 of body 20 as best seen in FIG. 1. Port 52 through end closure 34 supplies fluid pressure to piston chamber 54 above piston 40 and port 56 through tubular body 28 supplies fluid pressure to piston chamber 58 below piston 40.

Clamp 10 is used to secure the flanged ends of tubular members 60 and 62 together as hereinafter described. With the flanged ends of tubular members 60 and 62 positioned within lips 14 of first body 12, fluid pressure is delivered through port 52 into chamber 54 causing piston 40 to move downwardly within tubular body 28 which moves body 20 downwardly toward body 12 so that lips 22 also engage the flanged ends of tubular members 60 and 62. The downward movement of piston 40 and body 20 creates side openings 64 between the facing portions of plate 30 and body 20. Ports 66 extend into body 20 at each side thereof to receive piston projections 68 on locking blocks or wedges 70. Locking blocks 70 are moved into side openings 64 while piston 40 is retaining body 20 in tight engagement with the flanged ends of tubular members 60 and 62 and also by virtue of the connection of tension members 18 in plate 30 maintains the desired tension in tension members 18 which is created by piston 40. Piston projections 68 on locking blocks 70 are received within ports 66 which are in communication through passages 72 with a suitable supply of fluid pressure which is applied thereto to assist in the removal of blocks 70. Blocks 70 are suitably connected to body 20 as by chains 74 to ensure that they are available when their insertion into side openings 64 is desired.

Figure 2:
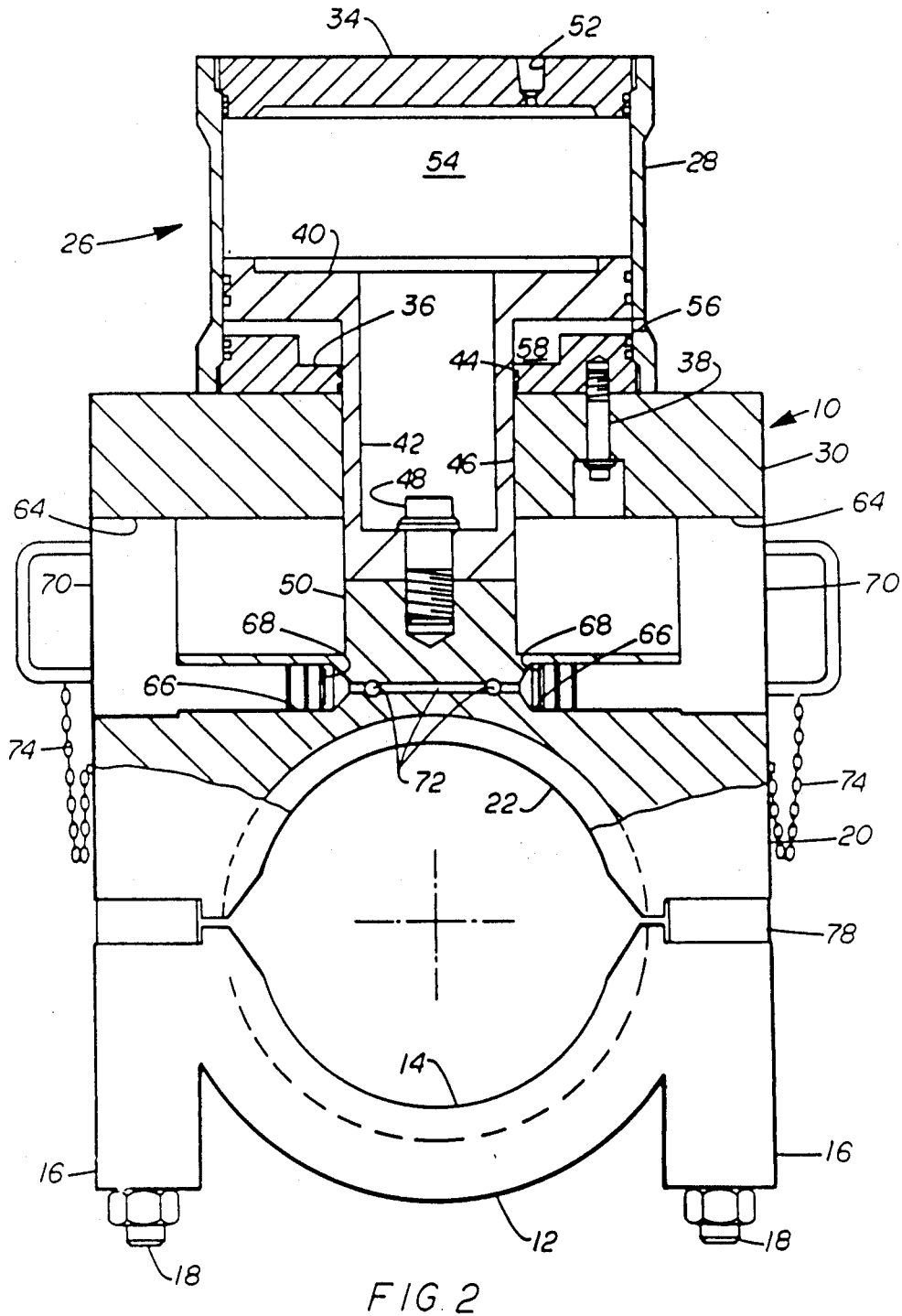
FIG. 2 is a similar view with the improved connector clamp closed and with the actuator locked in its preload position.
Figure 3:
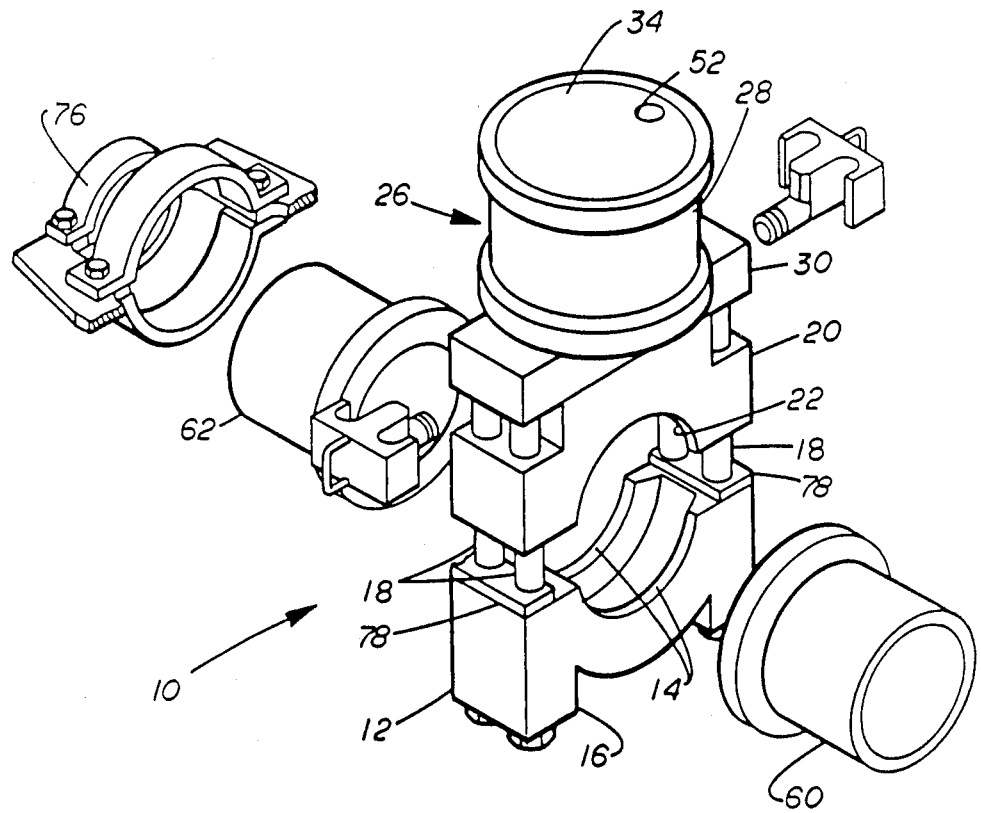
FIG. 3 is an exploded view of the improved connector clamp and the flanged ends of tubular members which are to be connected by the clamp.

As shown in FIG. 3, tubular members 60 and 62 are connected by clamp connector 10 by first assembling fitting 76 around tubular member 62 so that it surrounds member 62 and has its arms 78 being engaged with tension members 18 so that flange 62a on the end of tubular member 62 is positioned within the internal recess of first arcuate segment 12 immediately inside of the lip 14 and thereafter tubular member 60 is brought into position within the internal recess of first arcuate segment 12 with its flange 60a abutting flange 62a and engaging within the lip 14. With the tubular members engaged within arcuate segment 12, pressure is delivered through port 52 and vented from port 56 so that piston 40 is moved downwardly from the position shown in FIG. 1 to the position shown in FIG. 2 so that segments 12 and 20 are moved together to bring the lips 22 of segment 20 into tight engagement with flanges 60a and 62a of members 60 and 62. The level of pressure delivered to actuator 26 is controlled so that when segments 12 and 20 are in their clamping engagement of flanges 60a and 62a, tension members 18 are loaded to a preselected preload. In this condition, locking blocks 70 are moved into their positions between the upper surface of segment 20 and the lower surface of plate 30 as shown in FIG. 2. Thereafter, pressure within piston chamber 54 is vented and this preload tension in tension members 18 is maintained by locking blocks 70 which maintain the spacing between segment 20 and plate 30. In the insertion of locking blocks 70, their piston projections 68 are moved into ports 66. With projections 68 in this position, removal of blocks 70 can be accomplished when it is desired to release clamp 10 from the ends of tubular members 60 and 62 by delivering fluid pressure to actuator 26 which is sufficient to increase the tension in members 18 slightly. This releases the load on blocks 70. Fluid pressure is then delivered through passages 72 into the inner ends of ports 66 to assist in the removal of blocks 70 from their positions between segment 20 and plate 30.

It should be noted that the adjustment of the preselected preload tensioning of tension members 18 can be provided by the threading of nuts on the lower ends of members 18 to increase or decrease the length of members 18 available for the tensioning. Thus, as the nuts 19 are threaded on studs 18, they decrease the length of studs between the lower face of segment 12 and the lower face of plate 30. A decrease in this length will require a greater degree of tensioning to allow the entry of locking blocks 70 into the space below plate 30. Also, the unthreading of the nuts 19 to increase the length of studs will allow a lower tensioning which allows the entry of locking blocks 70 into the space below plate 30.

From the foregoing it can be seen that the improved pipe connector clamp of the present invention provides a mechanism which clamps abutting ends of pipes together and which is easy to operate and requires only fluid pressure for setting and releasing the clamp. The fluid pressure is not needed to retain the clamp in its loaded condition in engagement with the ends of the pipes. The locking blocks which function to retain the preload on the studs and the two segments which engage the pipe ends are easily removed as they include a piston projection which can be pressurized to force it out of engagement with the surfaces of the upper segment and the plate into which the studs are engaged.

What is claimed is:

1. A connector clamp for connecting and securing flanges on abutting ends of tubular members together in sealing relationship comprising a first arcuate clamping member having opposed annular lips for engaging flanges of abutting tubular members, a second arcuate clamping member having opposed annular lips for engaging the flanges of abutting tubular members, a pressure responsive actuator, said actuator including a first portion connected to one of said clamping members, a second portion connected to a plate, tension members connecting said pressure responsive actuator to one of said arcuate clamping members, said plate having said tension members secured thereto, actuation of said pressure responsive actuator in one direction moving said clamping members into tight clamping engagement with the flanges of the abutting tubular members and to preload said tension members, means coacting with said pressure responsive actuator and said clamping members to maintain said tension members under the desired preload condition independent of the pressure on said actuator, actuation of said actuator to close said clamping members moving said first portion into spaced relationship from said plate, said coacting means being sized to be positioned in the space between said plate and said one of said clamping members, opposed openings in said one of said clamping members, means for supplying fluid under pressure to said opposed openings, and a piston on each of said coacting means sized for sliding and sealing position within said openings when installed to maintain the preset tension load in said tension members.

* * * * *